United States Patent
Golubev

(10) Patent No.: US 10,104,196 B2
(45) Date of Patent: Oct. 16, 2018

(54) METHOD OF AND SERVER FOR TRANSMITTING A PERSONALIZED MESSAGE TO A USER ELECTRONIC DEVICE

(71) Applicant: YANDEX EUROPE AG, Lucerne (CH)

(72) Inventor: Fedor Anatolievich Golubev, Magnitogorsk (RU)

(73) Assignee: Yandex Europe AG, Lucerne (CH)

( * ) Notice: Subject to any disclaimer, the term of this patent is extended or adjusted under 35 U.S.C. 154(b) by 236 days.

(21) Appl. No.: 15/294,926

(22) Filed: Oct. 17, 2016

(65) Prior Publication Data
US 2017/0126835 A1    May 4, 2017

(30) Foreign Application Priority Data
Oct. 30, 2015   (RU) ................................ 2015146878

(51) Int. Cl.
*G06F 15/16*   (2006.01)
*H04L 29/08*   (2006.01)
(Continued)

(52) U.S. Cl.
CPC ...... *H04L 67/306* (2013.01); *G06F 17/30867* (2013.01); *H04L 47/82* (2013.01);
(Continued)

(58) Field of Classification Search
USPC ........................................................ 709/203
See application file for complete search history.

(56) References Cited

U.S. PATENT DOCUMENTS 8,291,312 B1    10/2012  Zhou
9,990,650 B1 *   6/2018  Kakani .............. G06Q 30/0277
(Continued)

FOREIGN PATENT DOCUMENTS

CN    104244031 A    12/2014
EA      008679 B1     6/2007
(Continued)

OTHER PUBLICATIONS

Russian Search Report dated Nov. 7, 2016 for Russian Patent application No. 2015146878.
(Continued)

*Primary Examiner* — Umar Cheema
*Assistant Examiner* — Anthony T Rotolo
(74) *Attorney, Agent, or Firm* — BCF LLP

(57) ABSTRACT

There are disclosed a method of sending personalized content to an electronic device associated with a user. The method comprises: receiving, by the network resource server from the electronic device, a user request to access the network resource; in response to the user request, transmitting, by the network resource server to the electronic device a trigger associated with the network resource, the trigger configured to cause the electronic device to download the generic content portion of the network resource from the network resource server and the personalized content portion of the network resource from the personalized content server. The method further comprises transmitting by the network resource server to the personalized content server an auxiliary request for the personalized content portion, and inserting, by the network resource server, the personalized content portion into the network resource to render an updated network resource.

18 Claims, 8 Drawing Sheets

(51) Int. Cl.
*H04L 12/911* (2013.01)
*H04L 29/06* (2006.01)
*G06F 17/30* (2006.01)
*G06F 17/22* (2006.01)

(52) U.S. Cl.
CPC .......... *H04L 65/1063* (2013.01); *H04L 67/02* (2013.01); *H04L 67/146* (2013.01); *H04L 67/18* (2013.01); *H04L 67/22* (2013.01); *H04L 67/2804* (2013.01); *H04L 67/42* (2013.01); *G06F 17/2235* (2013.01); *G06F 17/2288* (2013.01)

(56) References Cited

U.S. PATENT DOCUMENTS

| | | |
|---|---|---|
| 2002/0010716 A1 | 1/2002 | McCartney et al. |
| 2003/0033380 A1 | 2/2003 | Kuriyama |
| 2003/0163372 A1 | 8/2003 | Kolsy |
| 2004/0107177 A1 | 6/2004 | Covill et al. |
| 2009/0248607 A1 | 10/2009 | Eggink et al. |
| 2012/0209945 A1 | 8/2012 | Chadrasekhar et al. |
| 2012/0239510 A1 | 9/2012 | Geer et al. |
| 2012/0259945 A1 | 10/2012 | Gupta et al. |
| 2014/0129922 A1 | 5/2014 | Gnech et al. |
| 2014/0195587 A1 | 7/2014 | Sukoff |
| 2014/0229298 A1 | 8/2014 | Grun |
| 2014/0358688 A1* | 12/2014 | Tuttle .................. G06Q 30/0267 705/14.64 |
| 2015/0058141 A1 | 2/2015 | Yablonka et al. |
| 2015/0134465 A1 | 5/2015 | McKeon et al. |
| 2015/0199447 A1 | 7/2015 | Zhou |
| 2016/0140626 A1* | 5/2016 | Agarwal ............ G06Q 30/0276 715/234 |
| 2016/0260129 A1* | 9/2016 | Fadeev .................... H04L 67/22 |
| 2016/0359945 A1* | 12/2016 | Boudville ............... H04L 67/02 |

FOREIGN PATENT DOCUMENTS

| | | |
|---|---|---|
| JP | 4729479 B2 | 7/2011 |
| RU | 2003135206 A | 5/2005 |
| RU | 82897 U1 | 5/2009 |
| RU | 2507568 C2 | 1/2012 |

OTHER PUBLICATIONS

English abstract for RU2003135206 retrieved from Espacenet on Nov. 22, 2016.

English abstract for RU828976 retrieved from Espacenet on Nov. 22, 2016.

English abstract for JP4729479 retrieved from Espacenet on Nov. 22, 2016.

English abstract for EA008679 retrieved from Espacenet on Nov. 22, 2016.

* cited by examiner

METHOD OF AND SERVER FOR TRANSMITTING A PERSONALIZED MESSAGE TO A USER ELECTRONIC DEVICE

CROSS-REFERENCE

The present application claims priority to Russian Patent Application No. 2015146878, filed Oct. 30, 2015, entitled "METHOD OF AND SERVER FOR TRANSMITTING A PERSONALIZED MESSAGE TO A USER ELECTRONIC DEVICE", the entirety of which is incorporated herein by reference.

FIELD

The present technology relates to transmission of data in general, and to a method of and a system for transmitting a personalized message to a user electronic device.

BACKGROUND

Various global or local communications networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to have access to rich content (like images, audio, video, animation, and other multimedia content from such networks).

The user can access the information available on the Internet by several means. The given user can access a particular resource directly, either by typing an address of the resource (typically an URL or Universal Resource Locator, such as www.webpage.com) or by clicking a link in an e-mail or in another web resource. This is particularly useful when the user knows what the resource she or he is interested in.

Alternatively, the given user may conduct a search using a search engine to locate a resource of interest. The latter is particularly suitable in those circumstances, where the given user knows a topic of interest, but does not know the exact address of the resource she is interested in. There are numerous search engines available to the user. Some of them are considered to be general purpose search engines (such as Yandex™, Google™, Yahoo™ and the like). Others are considered to be vertical search engines—i.e. search engines dedicated to a particular topic of search—such as Momondo™ search engine dedicated to searching flights. Irrespective of which search engine is used, the search engine is generally configured to receive a search query from a user, to perform a search and to return a ranked search engine results page (SERP) to the user.

When accessing the particular web site or conducting the search, the user can be presented with generic content or personalized content. The generic content is the content that would be shown to any user accessing the particular resource without taking into account user-specific parameters, such as user interests, user interaction history and the like. Personalized content is a type of content that is specifically personalized for the given user, based on predicted or known user interest parameters.

For example, the search result ranking can be generic (using a generic search engine result ranking algorithm) or personalized for the given user (i.e. ranked at least in part based on the information known about the given user, such as past queries, past search result interactions and the like). By the same token, a given web resource can provide generic content and personalized content to the user. Personalized content can take many forms, such as a targeted message incorporated into the content of the web site, the targeted message having been selected for the given user as a relevant message based on certain information known about the given user.

The targeted message can be provided by a provider of the generic content of the given web resource or, alternatively, it can come from a third-party source and inserted into the generic content otherwise available on the web resource.

With reference to FIG. 1, there is depicted a typical prior art system (not numbered) for delivering personalized content to a user 104 of an electronic device 102 over a communication network 106. To that end, coupled to the communication network 106 are a content provider server 108 and a personalized content provider server 110. Let it now be assumed that the user 104 is desirous of accessing a web resource 112 hosted by the content provider server 108. To that end, the electronic device 102 can execute a browser, such as a GOOGLE™ browser, a YANDEX™ browser, a SAFARI™ browser and the like. Let is also be assumed that the user 104 types in a URL address associated with the network resource 112 (such as, as an example, www.example-address.com).

In response to the user 104 attempt to access the network resource 112, the electronic device 102 generates a resource request 120 in accordance with a suitable communication protocol and transmits it, via the communication network 106, to the content provider server 108. The content provider server 108 receives the resource request 120 and determines that the network resource 112 is what the user 104 is looking for (based on the URL, for example, the process known as "address resolving"). The content provider server 108 determines that the network resource 112 contains a generic portion and a personalized portion. The content provider server 108 can further determine that the content of the generic portion is stored by the content provider server 108 and that the content for the personalized portion is stored by the personalized content provider server 110. To that end, the content provider server 108 sends a personalized content request 122 via the communication network 106 (or a separate network, as the case may be) to the personalized content provider server 110. The personalized content request 122 includes inter alia an indication of a user identifier and/or an indication of user interests associated with the user 104.

Based on the user identifier and/or the user interests, the personalized content provider server 110 selects content for the personalized content portion and transmits a personalized content portion data 124, via the communication network 106, to the content provider server 108. The personalized content portion data 124 can, for example, contain a script for embedding into the personalized portion of the network resource 112, the script, when executed on the electronic device 102, for downloading the personalized content from the personalized content provider server 110.

US patent application 2015/0058141 is directed to detecting and mitigating advertisement abuse software on a user device includes producing a digital document comprising a specification for a default advertisement and content. Advertisement abuse software for preventing the default advertisement from being displayed as specified on the user device is detected based on a test associated with one or more test elements. A specification for embedding an alternative advertisement in the digital document is generated, so as to prevent detection by advertisement abuse software, and a display of one of the default advertisement and the alternative advertisement is facilitated on the user device based on whether advertisement abuse software is detected.

US patent application 2014/0129922 teaches ensuring integrity of a displayed web page in a client-server infrastructure including defining an enhancement for a web page markup for an enhanced web page content including a provided web page content and at least one identified provider added content as prerequisite content for the provided content, implementing a secure web browser document object model (DOM) enhancement and an enhanced document object model (DOM) processing embedding a user-requested content and the at least one corresponding prerequisite content based on the web page markup enhancement so that the requested content and the at least one prerequisite content of the enhanced web page content of an enhanced web page are secured and displayed as entity.

US patent application 2014/0229298 discloses determination of whether ad-blocking software is executing on a client device may be provided. Advertising content from an advertising server may be received at a client device. The advertising content may be provided in a client application executing on the client device and may have information embedded therein. The client device may attempt to detect the information embedded within the advertising content. Based on the attempted detection, it may be determined whether ad-blocking software is executing on the client device. When it is determined that ad-blocking software is executing on the client device, a remedial action may be performed.

SUMMARY

Developers of the present technology have appreciated at least one technical problem associated with the prior art approaches to delivering personalized content to the user 104. More specifically, many browsers of electronic devices 102 execute so-called content filtering applications, also known as "ad blockers". Content filtering applications are generally configured to remove or alter personalized content from the network resources 112. Typically, the content filtering applications target advertising and other commercial messages placed within the network resource 112, but are not so limited. As such, the active content filtering application can alter or remove or otherwise prevent the user 104 from accessing the personalized content on the network resource 112 that the user 104 may otherwise be interested in.

It is an object of the present technology to ameliorate at least some of the inconveniences present in the prior art.

According to a first broad aspect of the present technology, there is provided a method of sending personalized content to an electronic device associated with a user. The method is executable in a personalized content system, the personalized content system including: a communication network; a network resource server hosting a network resource and accessible via the communication network, the web resource having a generic content portion and a personalized content portion; the electronic device configured to access the network resource via the communication network, a personalized content server coupled to the communication network and accessible by the network resource server and the electronic device via the communication network. The method comprises: receiving, by the network resource server from the electronic device, a user request to access the network resource; in response to the user request, transmitting, by the network resource server to the electronic device a trigger associated with the network resource, the trigger configured to cause the electronic device to download the generic content portion of the network resource from the network resource server and the personalized content portion of the network resource from the personalized content server such that the generic content portion and the personalized content portion are rendered on a screen of the electronic device; transmitting by the network resource server to the personalized content server an auxiliary request for the personalized content portion, the auxiliary request including a first user identifier, the first user identifier uniquely identifying the user for the network resource server, the auxiliary request configured to cause the personalized content server (i) to match the first user identifier with a second user identifier, the second user identifier uniquely identifying the user for the personalized content server, and (ii) to return to the network resource server the personalized content portion that is selected for the user based on the second user identifier; inserting, by the network resource server, the personalized content portion into the network resource to render an updated network resource; and transmitting, by the network resource server to the electronic device, the updated network resource for rendering on the screen.

In some embodiments of the method, the method further comprises receiving, by the network resource server from the electronic device, an indication of inability of the electronic device to download the personalized content portion, and wherein transmitting by the network resource server to the personalized content server the auxiliary request is executed in response to the indication of inability.

In some embodiments of the method, the method further comprises, at a time prior to the receiving, by the network resource server from the electronic device, the user request to access the network resource: provisioning by the network resource server the first user identifier.

In some embodiments of the method, the provisioning comprises: transmitting by the network resource server to the electronic device a cookie containing the indication of the first user identifier.

In some embodiments of the method, the method further comprises, at a time prior to the receiving, by the network resource server from the electronic device, the user request to access the network resource: provisioning by the network resource server the first user identifier; and transmitting by the network resource server to the electronic device a data packet containing the indication of the first user identifier; the electronic device being configured to send the data packet to the personalized content server such that the personalized content server (i) generates the second user identifier; and (ii) creates a pairing between the first user identifier and the second user identifier and (iii) stores an indication of the pairing of the first user identifier and the second user identifier.

In some embodiments of the method, the first user identifier is a cookie.

In some embodiments of the method, where the electronic device is a wireless electronic device, the first user identifier is a mobile operating system identifier.

In some embodiments of the method, the method further comprises at a time prior to the receiving, by the network resource server from the electronic device, the user request to access the network resource: provisioning by the network resource server the first user identifier; transmitting by the network resource server to the personalized content server the first user identifier; receiving from the personalized content server a redirection prefix; in response to the receiving, by the network resource server from the electronic device, the user request to access the network resource: transmitting by the network resource server to the electronic device the trigger augmented in the redirection prefix, the redirection prefix configured to cause the electronic device to: access the personalized content server and to transmit thereto an indication of the first user identifier; the transmission of the first user identifier causing the personalized content server to (i) generate the second user identifier; and (ii) create a pairing between the first user identifier and the second user identifier; and (iii) store an indication of the pairing of the first user identifier and the second user identifier and (iv) redirect the electronic device to the network resource server with an indication pointing to the network resource.

In some embodiments of the method, as part of redirection, the personalized content server further transmits an indication of the first user identifier to the network resource server.

In some embodiments of the method, the personalized content portion is selected based at least in part on at least a portion of a personalization data associated with the user, the at least the portion of the personalization data having been obtained, by the personalized content server, prior to the receiving, by the network resource server from the electronic device, the user request to access the network resource.

In some embodiments of the method, personalization data comprises at least one of: (i) browsing history, (ii) a list of application installed on the electronic device, (iii) usage information associated with at least one of the applications installed on the electronic device, and (iv) geo-information associated with the electronic device, the geo-information being at least one of historic and current.

In some embodiments of the method, the at least the portion of the personalization data is obtained by the personalized content server from the electronic device.

In some embodiments of the method, the electronic device executes a browser application, the browser application for enabling the user to access the network resource and wherein the personalization data is compiled, at least in part, by the browser application.

In some embodiments of the method, the at least the portion of the personalization data comprises browsing history and is obtained by the personalized content server by incorporating a tracking applet into one or more resources that have been visited by the user of the electronic device.

In some embodiments of the method, the network resource is encoded in an HTML code, and wherein the inserting, by the network resource server, the personalized content portion into the network resource comprises encoding the personalized content portion into HTML using a base64 standard.

In some embodiments of the method, the network resource is encoded in an HTML code, and wherein the inserting, by the network resource server, the personalized content portion into the network resource comprises inserting a link configured to cause the electronic device to download the personalized content portion from the network resource server.

In some embodiments of the method, the method further comprises prior to the inserting the link: downloading the personalized content portion from the personalized content server, the personalized content portion being implemented as an image; storing the image by the network resource server, the image having a unique address identifier; and wherein the link comprises an indication of the unique address identifier.

The method of claim 1, wherein the network resource is encoded in an HTML code, and wherein the inserting, by the network resource server, the personalized content portion into the network resource comprises inserting a link configured to cause the electronic device to download the personalized content portion from one of: (i) the network resource server and (ii) a third-party server.

In some embodiments of the method, the method further comprises, prior to inserting, receiving the personalized content portion from the personalized content server, and wherein the receiving comprises: receiving a compiled version of the personalized content portion ready for insertion into the network resource.

In some embodiments of the method, the method further comprises receiving rendering instructions associated with how the personalized content portion is to be inserted into the network resource.

In some embodiments of the method, the method further comprises, prior to inserting, receiving the personalized content portion from the personalized content server, and wherein the receiving comprises: receiving a non-compiled version of the personalized content portion, the method further comprising compiling the non-compiled version of the personalized content portion into a compiled version of the personalized content portion ready for insertion into the network resource.

In some embodiments of the method, the method further comprises receiving rendering instructions associated with the non-compiled personalized content portion and wherein the compiling is based, at least in part, on the rendering instructions.

In accordance with another broad aspect of the present technology, there is provided a personalized content system comprising: a communication network; a network resource server hosting a network resource and accessible via the communication network, the web resource having a generic content portion and a personalized content portion; an electronic device configured to access the network resource via the communication network, a personalized content server coupled to the communication network and accessible by the network resource server and the electronic device via the communication network; the network resource server comprising: a communication interface for communication with the electronic device via the communication network, a processor operationally connected with the communication interface, the processor configured to: receive from the electronic device, a user request to access the network resource; in response to the user request, transmit to the electronic device a trigger associated with the network resource, the trigger configured to cause the electronic device to download the generic content portion of the network resource from the network resource server and the personalized content portion of the network resource from the personalized content server such that the generic content portion and the personalized content portion are rendered on a screen of the electronic device; transmit to the personalized content server an auxiliary request for the personalized content portion, the auxiliary request including a first user identifier, the first user identifier uniquely identifying the user for the network resource server, the auxiliary request configured to cause the personalized content server (i) to match the first user identifier with a second user identifier, the second user identifier uniquely identifying the user for the personalized content server, and (ii) to return to the network resource server the personalized content portion that is selected for the user based on the second user identifier; insert the personalized content portion into the network resource to render an updated network resource; and transmit to the electronic device, the updated network resource for rendering on the screen.

In accordance with another broad aspect of the present technology, there is provided a network resource server. The network resource server comprises: a communication interface for communication with an electronic device via a communication network, a processor operationally connected with the communication interface, the processor configured to: host a network resource having a generic content portion and a personalized content portion; the generic content portion of the network resource being accessible via the communication network from the network resource server and the personalized content portion being accessible from a personalized content server coupled to the communication network and accessible by the network resource server and the electronic device via the communication network; receive from the electronic device, a user request to access the network resource; in response to the user request, transmit to the electronic device a trigger associated with the network resource, the trigger configured to cause the electronic device to download the generic content portion of the network resource from the network resource server and the personalized content portion of the network resource from the personalized content server such that the generic content portion and the personalized content portion are rendered on a screen of the electronic device; transmit to the personalized content server an auxiliary request for the personalized content portion, the auxiliary request including a first user identifier, the first user identifier uniquely identifying the user for the network resource server, the auxiliary request configured to cause the personalized content server (i) to match the first user identifier with a second user identifier, the second user identifier uniquely identifying the user for the personalized content server, and (ii) to return to the network resource server the personalized content portion that is selected for the user based on the second user identifier; insert the personalized content portion into the network resource to render an updated network resource; and transmit to the electronic device, the updated network resource for rendering on the screen.

In the context of the present specification, a "server" is a computer program that is running on appropriate hardware and is capable of receiving requests (e.g. from electronic devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "a electronic device" does not preclude multiple electronic devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "relevance factor of the search query result set" shall mean the likelihood that the user submitting the search query was intending to see data maintained within the search query result set.

In the context of the present specification, the expression "component" is meant to include software (appropriate to a particular hardware context) that is both necessary and sufficient to achieve the specific function(s) being referenced.

In the context of the present specification, the expression a "search query result set" is a listing of results returned by a search engine, which may encompass one or more general or specialized search modules, in response to a search query. Search query result set may contain a listing of results returned by a web search module, or by one or more vertical search modules, or by combination of results returned by web module and one or more vertical modules. The search query result set may also contain no results.

In the context of the present specification, the expression a "search engine result page" is a listing of results to be displayed to a client on an electronic device, the listing generated by combining a search query result set with targeted messages.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
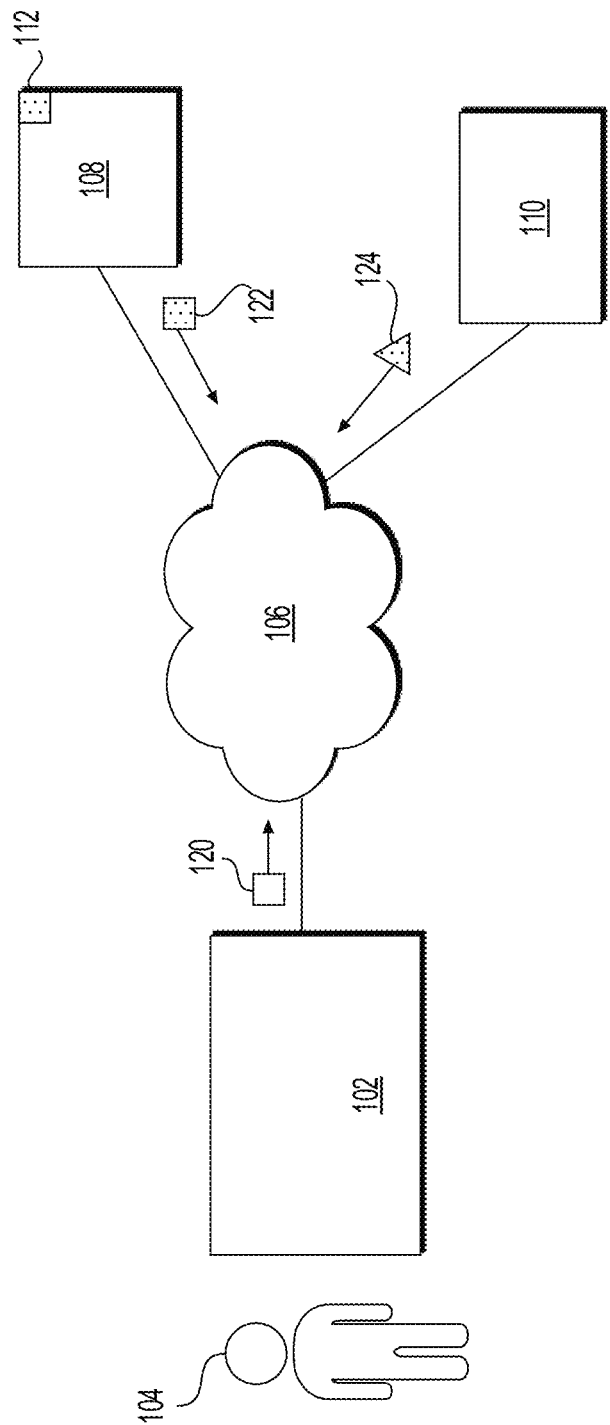
FIG. 1 is an illustration of a prior art system for delivering personalized content to an electronic device.
Figure 2:
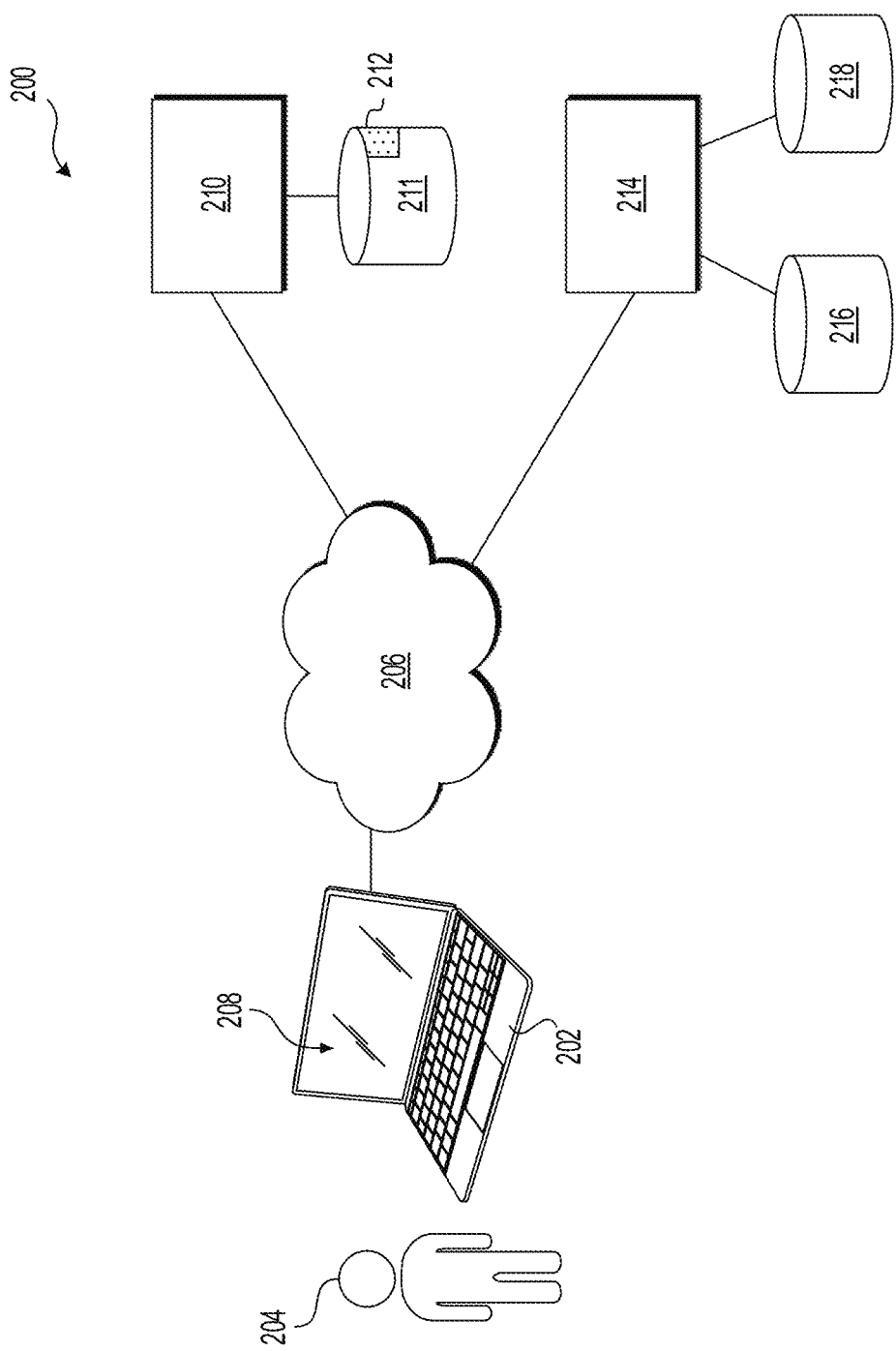
FIG. 2 depicts a diagram of a system implemented in accordance with non-limiting embodiments of the present technology.

Referring to FIG. 2, there has been shown a diagram of a system 200. It is to be expressly understood that the system 200 is merely one possible implementation of the present technology. Thus, the description thereof that follows is intended to be only a description of illustrative examples of the present technology. This description is not intended to define the scope or set forth the bounds of the present technology. In some cases, what are believed to be helpful examples of modifications to system 200 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the system 200 may provide in certain instances a simple implementation of the present technology, and that where such is the case they have been presented in this manner as an aid to understanding. As persons skilled in the art would understand, various implementations of the present technology may be of a greater complexity.

FIG. 2 illustrates the system 200 in accordance with one implementation of the present technology. The system 200 comprises an electronic device 202. The electronic device 202 is typically associated with a user 204 and, as such, can sometimes be referred to as a "client device". It should be noted that the fact that the electronic device 202 is associated with the user does not need to suggest or imply any mode of operation—such as a need to log in, a need to be registered or the like. Naturally, the system 200 can have a plurality of electronic devices similar or different from the electronic device 202.

The implementation of the electronic device 202 is not particularly limited, but as an example, the electronic device 202 may be implemented as a personal computer (desktops, laptops, netbooks, etc.), a wireless electronic device (a cell phone, a smartphone, a tablet and the like), as well as network equipment (a router, a switch, or a gateway). The general implementation of the electronic device 202 is known in the art and, as such, will not be described here at much length. Suffice it to say that the electronic device 202 comprises a user input interface (such as a keyboard, a mouse, a touch pad, a touch screen and the like) for receiving user inputs; a user output interface (such as a screen, a touch screen, a printer and the like) for providing visual or audible outputs to the user 204; a network communication interface (such as a modem, a network card and the like) for two-way communication over a communications network 206; and a processor coupled to the user input interface, the user output interface and the network communication interface, the processor being configured to execute various routines, including those described herein below. To that end the processor may store or have access to computer readable commands which commands, when executed, cause the processor to execute the various routines described herein.

The electronic device 202 comprises hardware and/or software and/or firmware (or a combination thereof) that enable the electronic device 202 to execute a browser application 208. Generally speaking, the purpose of the browser application 208 is to enable the user 204 to access one or more network resources via the communications network 206, such as a network resource 212 hosted by a network resource server 210.

Furthermore, the system 200 comprises the above-mentioned communications network 206. In some non-limiting embodiments of the present technology, the communications network 206 can be implemented as the Internet. In other embodiments of the present technology, the communications network 206 can be implemented differently, such as any wide-area communications network, local-area communications network, a private communications network and the like.

The system 100 further comprises the above-mentioned network resource server 210 coupled to the communications network 206 via a communication link (not separately numbered). The network resource server 210 can be implemented as a conventional computer server. In an example of an embodiment of the present technology, the network resource server 210 can be implemented as a Dell™ PowerEdge™ Server running the Microsoft™ Windows Server™ operating system. Needless to say, the network resource server 210 can be implemented in any other suitable hardware and/or software and/or firmware or a combination thereof. In the depicted non-limiting embodiment of present technology, the network resource server 210 is a single server. In alternative non-limiting embodiments of the present technology, the functionality of the network resource server 210 may be distributed and may be implemented via multiple servers.

The implementation of the network resource server 210 is well known. However, briefly speaking, the network resource server 210 comprises a communication interface (not depicted) structured and configured to communicate with various entities (such as the electronic device 102, for example and other devices potentially coupled to the communications network 206) via the communications network 206. The network resource server 210 further comprises at least one computer processor (not depicted) operationally connected with the communication interface and structured and configured to execute various processes to be described herein.

The network resource server 210 is configured to provide access to a plurality of network resources, one of which, a network resource 212 is depicted in FIG. 2. The network resource 212 can be accessed by the user 204 using the electronic device 202 in a number of ways, such as by entering an URL associated with the network resource 212 into the browser application 208 executed by the electronic device 202, by clicking a link (such as one in an e-mail, another network resource or on a search engine result page) directed to the network resource 212 or by any other suitable means.

The network resource 212 can be a web site, a web portal, a search result page, or the like. With brief reference to FIG. 7, the network resource 212 has a generic content portion 702 and a personalized content portion 704. The generic content portion 702 comprises content that that would be shown to any user accessing the network resource 212 without taking into account user-specific parameters, such as user interests, user interaction history and the like. Personalized content portion 704 comprises content that is specifically personalized (i.e. selected) for the given user (such as the user 204), based on predicted or known user interest parameters.

For example, for a newspaper portal (such as www.cnn.com or the like) being the network resource 212, the generic content portion 702 can contain top news that would be shown to any user accessing the newspaper portal, while the personalized content portion 704 can include news associated with a specific topic of interest for the user 204 (i.e. the personalized content portion 704 can have a selection of news specifically selected for a given user, such as the user 204. By the same token, the personalized content portion 704, in the same newspaper portal example, can include a targeted messaged, such as an ad that is specifically selected for the user 204.

Figure 7:
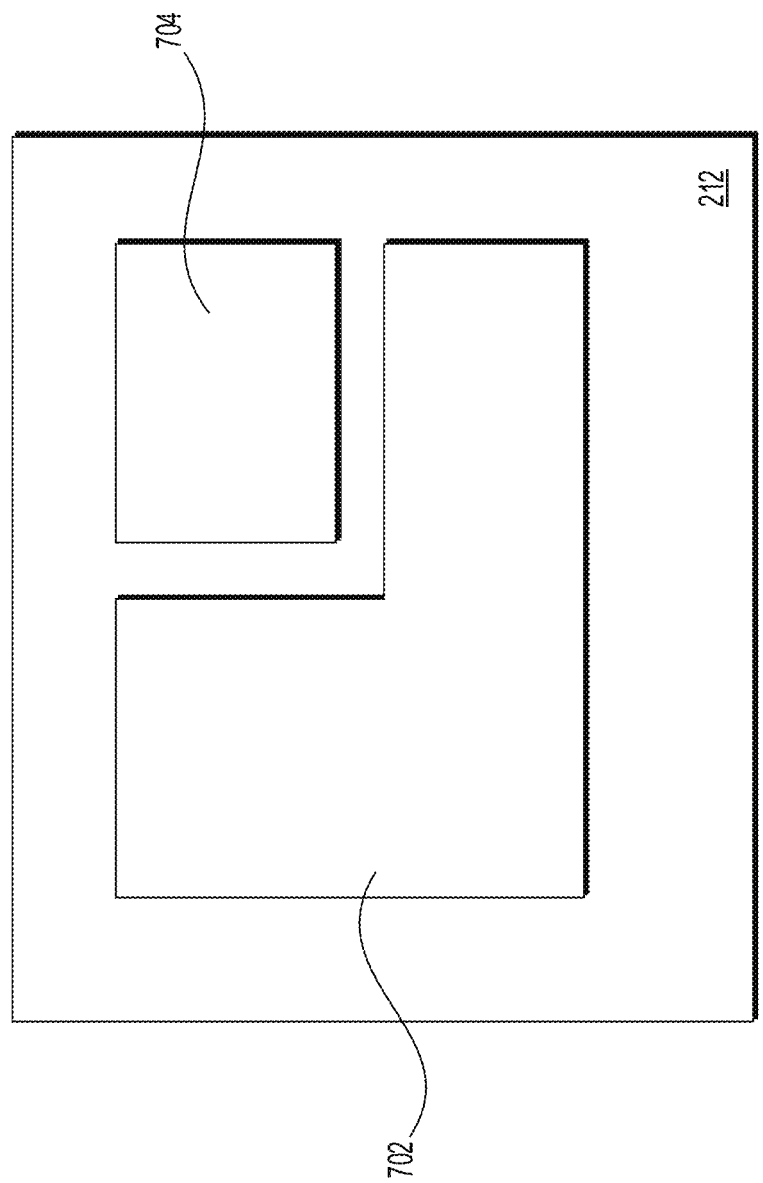
FIG. 7 depicts an illustration of a network resource that has a generic content portion and a personalized content portion, the network resource being accessible within the system of FIG. 2.

Even though the illustration of FIG. 7 schematically shows a single instance of the generic content portion 702 and a single instance of the personalized content portion 704, this needs not be so in every embodiment of the present technology. As such, it is contemplated that the given network resource 212 can have one or more instances of the generic content portion 702 and one or more instances of the personalized content portion 704. It should also be noted that the placement of the one or more instances of the generic content portion 702 and one or more instances of the personalized content portion 704 is not particularly limited. In some embodiments, some or all of the personalized content portion 704 can be visually distinguished from one or more instances of one or more instances of the generic content portion 702. In these embodiments, any one of the personalized content portion 704 can be located above, below, to the right or to the left of any one or more instances of one or more instances of the generic content portion 702. In some of these embodiments, any one of the personalized content portion 704 can be located in-between any two of the one or more instances of one or more instances of the generic content portion 702 (but still be visually distinguishable—such as by a different appearance, font, color, border or the like).

In other embodiments, some or all of the personalized content portion 704 can be visually non-distinguishable from one or more instances of one or more instances of the generic content portion 702. In these embodiments, any one of the personalized content portion 704 can be located in-between any two of the one or more instances of one or more instances of the generic content portion. This is a particularly applicable approach for those embodiments (without being so limited) where the network resource 212 is a search engine result page and the generic content portion 702 presents search results ranked in accordance with a generic ranking algorithm, while the personalized content portion 704 presents search results that are ranked in accordance with user-personalized ranking algorithm.

Returning to the description of FIG. 2, within embodiments of the present technology, the content of the generic content portion 702 is hosted by the network resource server 210 and, more particularly, is stored at a generic content database 211, the generic content database 211 being either accessible by the network resource server 210 or, alternatively, is implemented as part of the network resource server 210.

Figure 6:
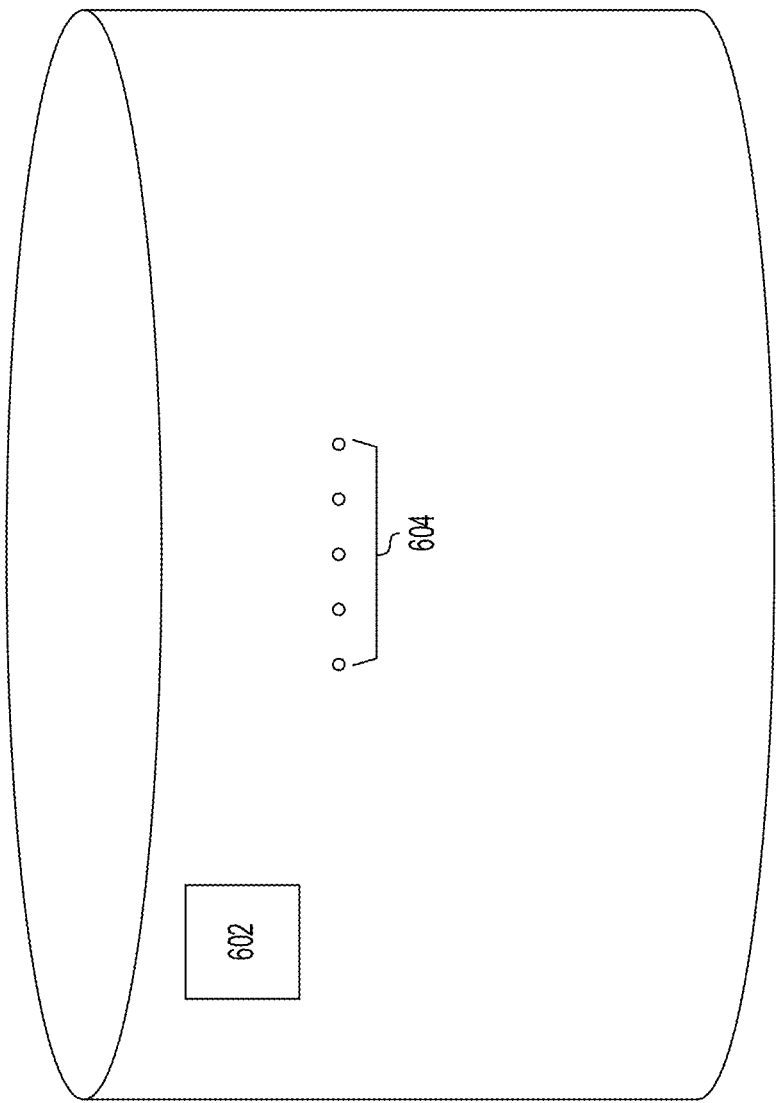
FIG. 6 depicted a non-limiting embodiment of a generic content database implemented in accordance with non-limiting embodiments of the present technology, the generic content database being part of the system of FIG. 2.

With reference to FIG. 6, there is depicted a non-limiting embodiment of the generic content database 211 implemented in accordance with non-limiting embodiments of the present technology. The generic content database 211 stores the content for the generic content portion 702, depicted in FIG. 6 at 602. The generic content database 211 also stores content for a plurality of additional network resources, the content depicted in FIG. 6 at 604. The generic content depicted at 604 can be generic content for other pages within the network resource 212 (the network resource 212 being a web site or web portal) or it can be generic content for other network resource(s) stored by the network resource server 210, similar or different from the network resource 212.

The content stored in the generic content database 211 can be individually addressable (i.e. retrievable) by the network resource server 210 using a unique content identifier (such as a Universal Resource Identifier or URI for short, a numeric content identifier or the like).

Figure 3:
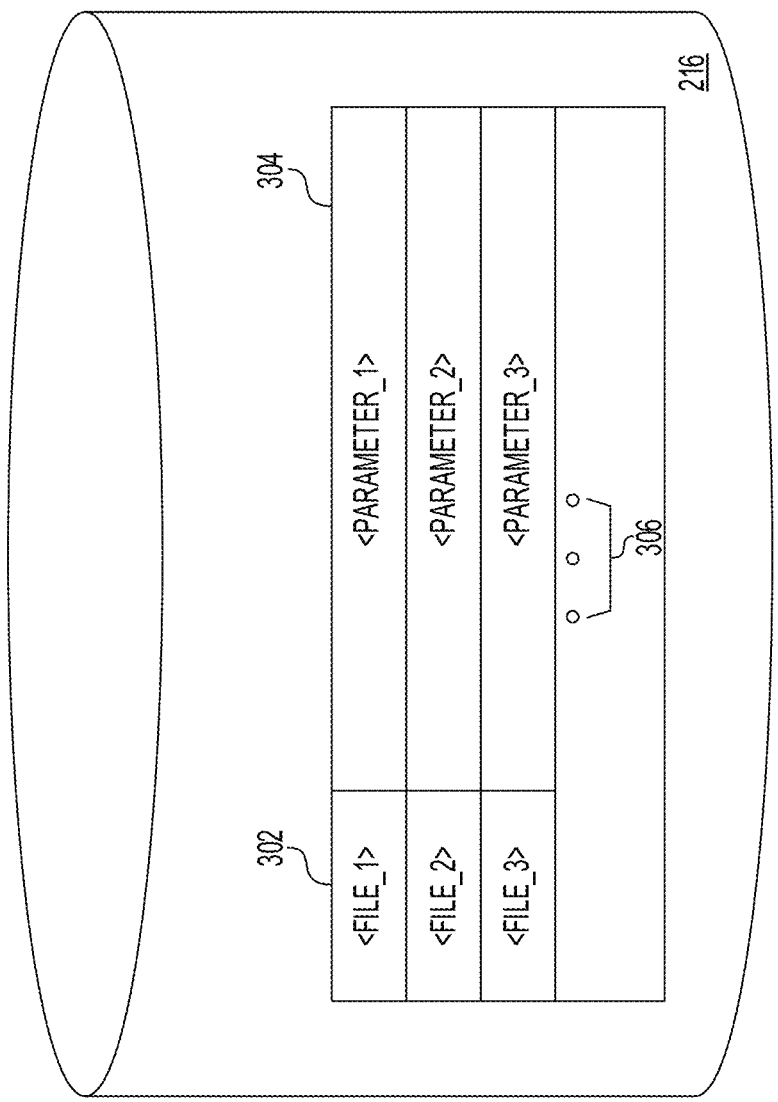
FIG. 3 depicts a non-limiting embodiment of a personalized content database implemented in accordance with non-limiting embodiments of the present technology, the personalized content database being part of the system of FIG. 2.

The content of the personalized content portion 704 is stored in a personalized content database 216. With reference to FIG. 3, there is depicted a non-limiting embodiment of the personalized content database 216 implemented in accordance with non-limiting embodiments of the present technology. The personalized content database 216 stores a plurality of possible contents for selection and inclusion into the personalized content portion 704.

As such, the personalized content database 216 maps an indication of a stored personalized content 302 with a selection parameter 304, associated respectively with the given one of the stored personalized content 302. The selection parameter 304 stores an indication of one or more descriptors that describe the potential audience (such as the user 204 or other users similar or different from the user 204) for whom the associated stored personalized content 302 is aimed for.

For example, the selection parameter 304 can identify one or more of: gender, social-economic status, age bracket, income bracket, general interest parameters (such as, for example: cars, sports, collectibles, famous artists and the like), time of the day when the personalized content should be shown, geographical region where the personalized content should be shown and the like.

In the depiction of FIG. 3, the personalized content with an identifier <file_1> is associated with <Parameter_1>, the personalized content with an identifier <file_2> is associated with <Parameter_2> and the personalized content with an identifier <file_3> is associated with <Parameter_3>. The personalized content database 216 can further store a number of additional possible content choices for the personalized content portion 704 jointly depicted at 306.

It should be apparent that even though the stored personalized content 302 is described as "personalized" for a given one of the user 204, that does not need to imply that the given instance of the stored personalized content 302 will be selected exclusively for a single one of a plurality of users (including the user 204). To the contrary, the stored personalized content 302 can be selected for the user 204 (based on certain parameters, as will be described below), as well as for another user, who can for example have similar interests to those of the user 204. Just as an example, let it be assumed that the stored personalized content 302 is a selection of tops news associated with category "Sports". Let it also be assumed that a prior browsing activity of the user 204 indicated that the user 204 has a particular keen interest in sports and, as such, based on the selection parameter 304, the given stored personalized content 302 can be selected for the user 204. However, if another user (not depicted) is also determined to be associated to have keen interest in sports, the same given personalized content 302 can be selected for the other user as well.

The content stored in the personalized content database 216 can be individually addressable (i.e. retrievable) by the network resource server 210 and/or by the electronic device 102 by a unique content identifier (such as a URL, a numeric content identifier or the like), which in some embodiments can be the same as the indication of a stored personalized content 302.

Figure 5:
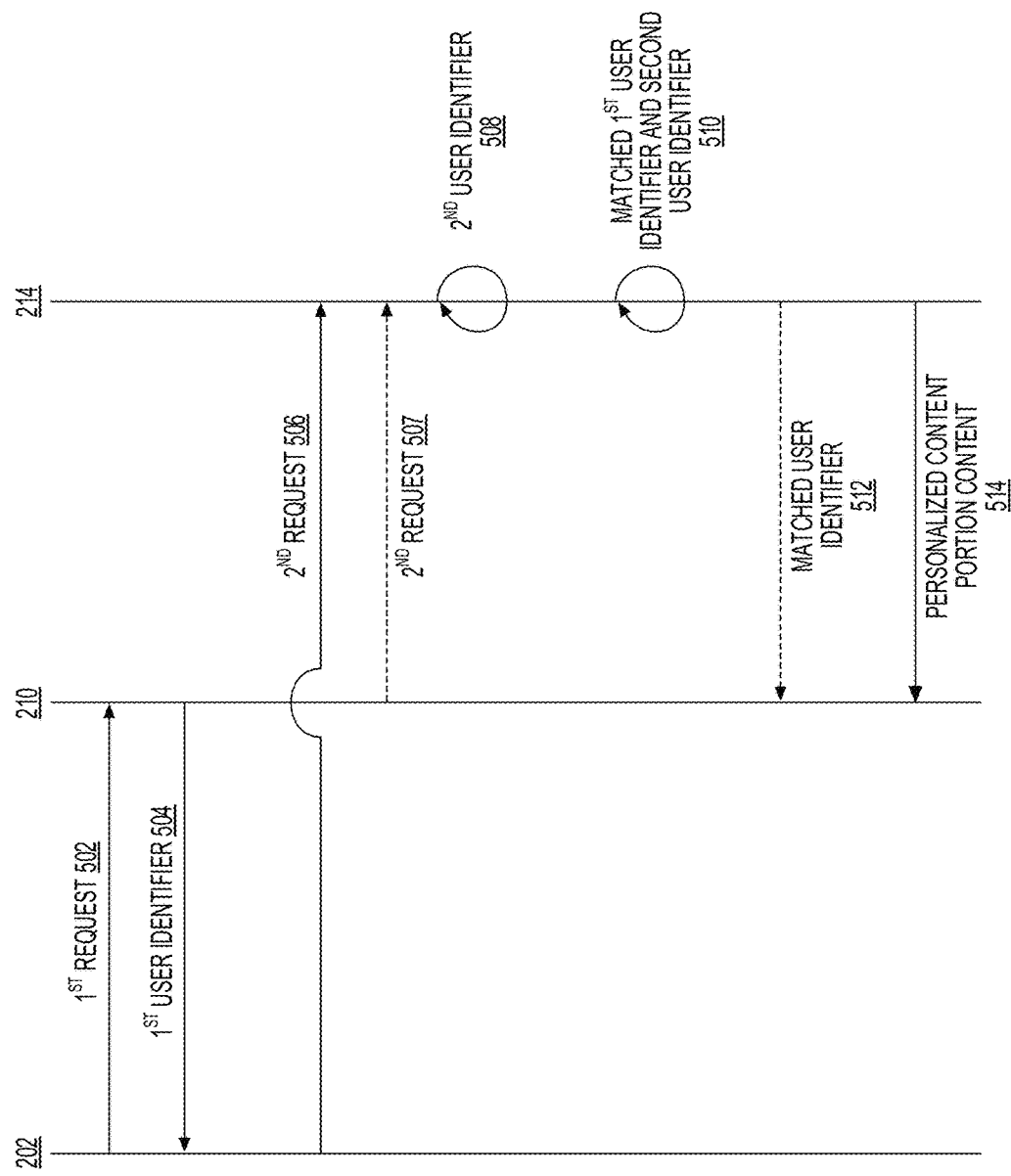
FIG. 5 depicts a signal flow diagram between an electronic device 202, a network resource server and a personalized content server of the system of FIG. 2.

Returning to the description of FIG. 2, the personalized content server 214 has access to a matched user identifier repository 218. How the content of the matched user identifier repository 218 is populated will be described in greater detail with reference to FIG. 5. FIG. 5 depicts a signal flow diagram between the electronic device 202, the network resource server 210 and the personalized content server 214.

The exchanged signals of FIG. 5 can be exchanged via the communications network 206 of FIG. 2.

The electronic device 202 transmits a first request 502 to the network resource server 210. The first request 502 can be transmitted, for example, when the electronic device 202 accesses, for the first time, a network resource (such as the network resource 212) stored by the network resource server 210. In response to the first request 502, the network resource server 210 transmits to the electronic device 202 a first user identifier 504 (this can be executed in addition to transmitting, by the network resource server 210, the content of the requested network resource 212).

The first user identifier 504 can be sent in a form of a cookie to be stored by the electronic device 202. In alternative embodiments, specifically applicable but not limited to those implementations where the electronic device 202 is implemented as a wireless electronic device, the first user identifier 504 can be implemented as a mobile operating system identifier (MOSID). Naturally, the first user identifier 504 can be sent in other forms, such as an IP address, a URL (query string), a hidden form field, an ETag, a browser fingerprint, a device fingerprint or the like.

In some embodiments of the present technology, the first user identifier 504 is sent to the electronic device 202 in response to determination that the electronic device 202 is unable to download the personalized content portion 704 of the network resource 212 from the personalized content server 214. How the determination that the electronic device 202 is unable to download the personalized content portion 704 is executed is not particularly limited. One example of an approach is disclosed in US patent application 2014/0229298, content of which is herein incorporated by reference in its entirety. However, the process for determining the inability of the electronic device 202 to download the personalized content portion 704 is not so limited and other alternatives are possible. In these embodiments (but not so limited), the first user identifier 504 can also be embodied in a redirection URL, the redirection URL for causing the electronic device to send a second request 506 to the personalized content server 214.

The first two steps of the signal flow chart of FIG. 5 can be thought of as a process for provisioning of the first user identifier 504.

Then, the electronic device 202 transmits to the personalized content server 214 the second request 506. The second request 506 can be sent, for example, in response to the network resource server 210 transmitting to the electronic device the network resource 212, the network resource having the generic content portion 702 and the personalized content portion 704. In other embodiments, the second request 506 can be sent, for example, in response to the network resource server 210 transmitting to the electronic device 202 the network resource 212, the network resource 212 having the generic content portion 702 and the personalized content portion 704 and a determination that the electronic device 202 is unable to download the personalized content portion 704 from the personalized content server 214.

In those embodiments, where software executed on the electronic device 202 blocks access from the electronic device 202 to the personalized content server 214 (for example, by blocking access to a particular URL associated with the personalized content server 214 or by blocking a particular type of the request that implements the second request 506), in lieu of the second request 506, the network resource server 210 can send the second request 507.

For the purposes of the description below, when referring to the second request 506, the description will cover the alternative second request 507.

The second request 506 includes inter alia an indication of the first user identifier 504. When the personalized content server 214 receives the second request 506, the second request 506 causes the personalized content server 214 to: i) generate the second user identifier 508; and (ii) create a pairing 510 between the first user identifier 504 and the second user identifier 508. The personalized content server 214 is further configured to store an indication of the pairing 510 of the first user identifier 504 and the second user identifier 508 in the matched user identifier repository 218.

In some embodiments of the present technology, the personalized content server 214 can further optionally transmit an indication of the matching having been completed to the network resource server 210, depicted in FIG. 5 as matched user identifiers 512. As part of or instead of the matched user identifiers 512, the personalized content server 214 can also select a particular stored personalized content 302 and transmit same to the network resource server 210, depicted in FIG. 5 as the personalized content portion content 514.

How the particular stored personalized content 302 is selected and what the network resource server 210 does with the particular stored personalized content 302 will be described below.

Figure 4:
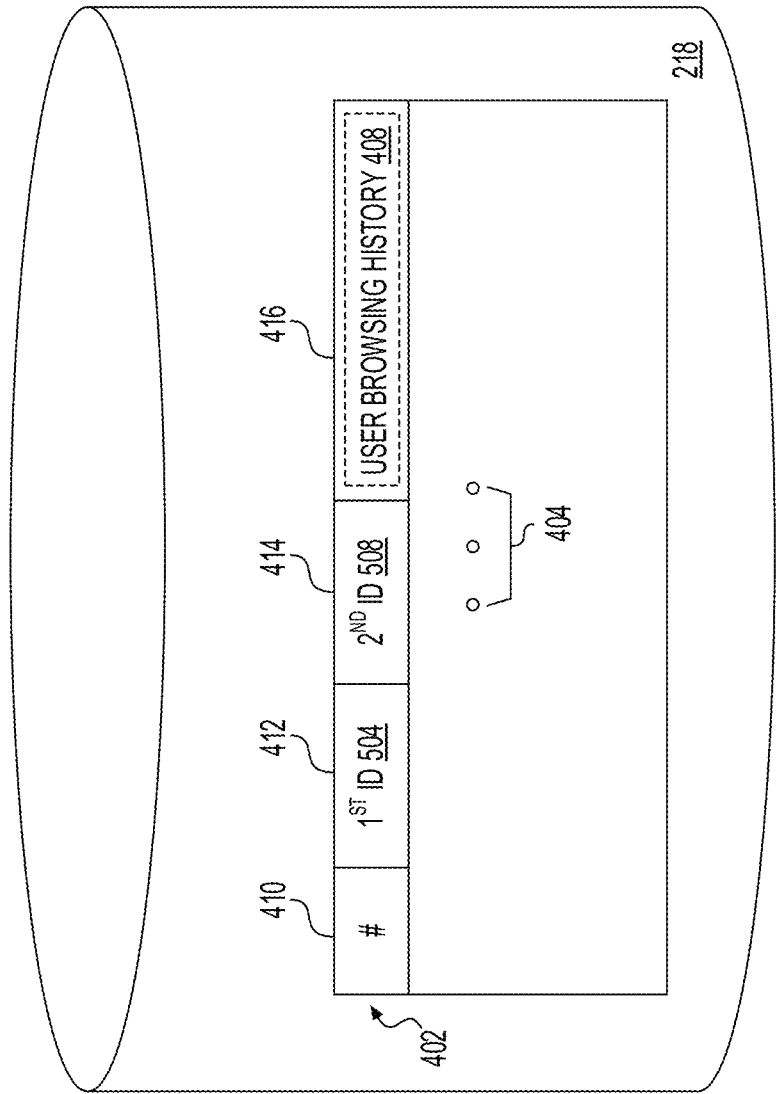
FIG. 4 depicts a non-limiting embodiment of a matched user identifier repository implemented in accordance with non-limiting embodiments of the present technology, the matched user identifier repository being part of the system of FIG. 2.

With reference to FIG. 4, there is depicted a non-limiting embodiment of the matched user identifier repository 218. The matched user identifier repository 218 stores one or more records, of which a first record 402 is depicted in detail with the rest of the one or more records being collectively depicted at 404.

The first record 402 maps a unique record identifier 410, with an indication 412 of the first user identifier 504, an indication 414 of the second user identifier 508 and, optionally, an indication 416 of a user browsing history 408. As will be appreciated from the description above, the first user identifier 504 and the second user identifier 508 stored in a given record (such as the first record 402) are the matched or paired ones of the first user identifier 504 and the second user identifier 508.

The process of creating the matching between the first user identifier and the second user identifier described above can be broadly categorized as "cookie matching". In alternative embodiments of the present technology, the first user identifier and the second user identifier can be matched as following.

The personalized content server 214 can provide a redirection prefix (F(URL)) for URLs associated with network resources 112 hosted by the network resource server 210. When the user 204 requests the network resource 212 from the network resource server 210, the network resource server 210 sends a link to the network resource 212 "wrapped" with the F(URL) much akin to search engines wrapping links to the search results provided on the search engine results page (SERP).

When the user 204 clicks (or otherwise actuates) any link to or embedded within the network resource 212, the browser application 208 is redirected to the personalized content server 214. The redirected request includes the first user identifier 504 previously provided by the network resource server 210. The personalized content server 214 can then create the second user identifier 508 and create the matching similarly to what was described above.

In yet another embodiment, an iframe connected to the personalized content server 214 can be embedded into the network resource 212. The iframe allows assigning a personalized content cookie file right from the network resource 212 without redirecting the user 204 to the personalized content server 214.

Now, we will turn our attention to how the personalized content server 214 selects the given one of the stored personalized content 302. In accordance with the embodiments of the present technology, the personalized content server 214 is configured to select a particular one of the stored personalized content 302 based at least in part on at least a portion of a personalization data associated with the user 204. The personalization data can include at least one of: (i) browsing history, (ii) a list of application installed on the electronic device, (iii) usage information associated with at least one of the applications installed on the electronic device, and (iv) geo-information associated with the electronic device, the geo-information being at least one of historic and current. Naturally, the personalization data can be implemented in a number additional ways.

The at least the portion of the personalization data can be obtained, by the personalized content server 214 in a number of ways (and naturally, this can be done at a point of time prior to executing the selection of the given one of the stored personalized content 302). In a specific embodiment of the present technology, the personalized content server 214 can obtain the at least the portion of the browsing history from the electronic device 202. For example, recalling that the electronic device 202 executes the browser application 208 (the browser application 208 for enabling the user 204 to access the network resource 212), the browsing history can be compiled, at least in part, by the browser application 208.

Alternatively, the at least the portion of the browsing history can be obtained by the personalized content server 214 by incorporating a tracking applet (not depicted) into one or more resources that have been visited by the user 204 of the electronic device 202. One example of such the tracking applet is Yandex.Metrika™. Another example of such the tracking application is Google™ Analytical (Premium) product. Naturally, a combination of these two approaches and/or other approaches can be used by the personalized content server 214 to determine the browsing history associated with the user 204.

It should be also understood that even though the description presented here uses the browsing history (or personalization information in general) as a proxy for determining user interests, the personalized content server 214 can use other information for determining user interest. For example, in an alternative embodiment, the user 204 can expressly provision her or his interest (for example, by visiting a provisioning web portal associated with the personalized content server 214). In yet further embodiments, the personalized content server 214 can employ other information for determining user interests.

Once the personalized content server 214 selects the particular one of the stored personalized content 302, the personalized content server 214 transmits the so-selected stored personalized content 302 to the network resource server 210 (depicted at 514 in FIG. 5). In some embodiments, the personalized content server 214 transmits the so-selected stored personalized content 302 to the network resource server 210 as a JavaScript Object Notation (JSON) message. Within these embodiments, when the network resource server 210 receives the so-selected stored personalized content 302, the network resource server 210 composes the so-selected stored personalized content 302 into a format suitable for insertion into the personalized content portion 704 (i.e. the network resource server 210 determines placement, appearance and the like).

In alternative embodiments of the present technology, the personalized content server 214 transmits, in addition to the so-selected stored personalized content 302, an indication of the requirements of how the so-selected stored personalized content 302 is to be incorporated into the personalized content portion 704. For example, in those embodiments, where the network resource 212 is encoded in HTML, the indication of the requirements can be sent in form of an additional HTML code that is to be inserted into the HTML code of the network resource 212 such the so-selected stored personalized content 302 is inserted into the personalized content portion 704.

Once the network resource server 210 receives the so-selected stored personalized content 302 and, optionally, the indication of the requirements of how the so-selected stored personalized content 302 is to be incorporated, the network resource server 210 incorporates the so-selected stored personalized content 302 into the personalized content portion 704.

There are several alternatives as to how the network resource server 210 can incorporate the so-selected stored personalized content 302 into the personalized content portion 704. It should be recalled here that the network resource 212 can be encoded in HTML.

In some embodiments, the network resource server 210 can store the so-selected stored personalized content 302 as an image at the generic content database 211, the stored personalized content 302 having a unique identifier/address at the generic content database 211. Within these embodiments, the network resource server 210 can insert a link pointing to the so-stored personalized content 302 at the network resource server 210. When the browser application 208 executed on the electronic device 202 receives content of the network resource 212 to be rendered having such an inserted link to the personalized content portion 704, the browser application 208 can download the image associated with the personalized content portion 704 from the network resource server 210 by following the link.

Alternatively, the network resource server 210 can code the image associated with the personalized content portion 704 as HTML using base64 script. Base64 script may be directly inserted into the HTML code associated with the network resource 212 and sent to the electronic device 202. Base64 script allows encoding images as a part of the HTML code without using links for downloading them from a remote server.

In yet additional embodiments, the image associated with the personalized content portion 704 can be stored by the personalized content server 214 (instead of transmitting such information to the network resource server 210). Within these embodiments, the network resource server 210 can provide a link to the image stored at the personalized content server 214 and wrap such a link into a proxy link associated with the network resource server 210.

In yet other embodiments of the present technology, the personalized content server 214 can transmit to the network resource server 210 an image identifier identifying the image associated with the selected stored personalized content 302. The network resource server 210 can access the personalized content database 216 using the so-received image identifier and download the associated image from the personalized content database 216. The network resource server 210 can then insert the so-retrieved image into the personalized content portion 704 using an URL associated with the network resource server 210.

Alternatively, the network resource server 210 can store the so-received image at the generic content database 211, the stored personalized content 302 having a unique identifier/address at the generic content database 211. Within these embodiments, the network resource server 210 can insert a link pointing to the so-stored personalized content 302 at the network resource server 210. When the browser application 208 executed on the electronic device 202 receives content of the network resource 212 to be rendered having such an inserted link to the personalized content portion 704, the browser application 208 can download the image associated with the personalized content portion 704 from the network resource server 210 by following the link.

Figure 8:
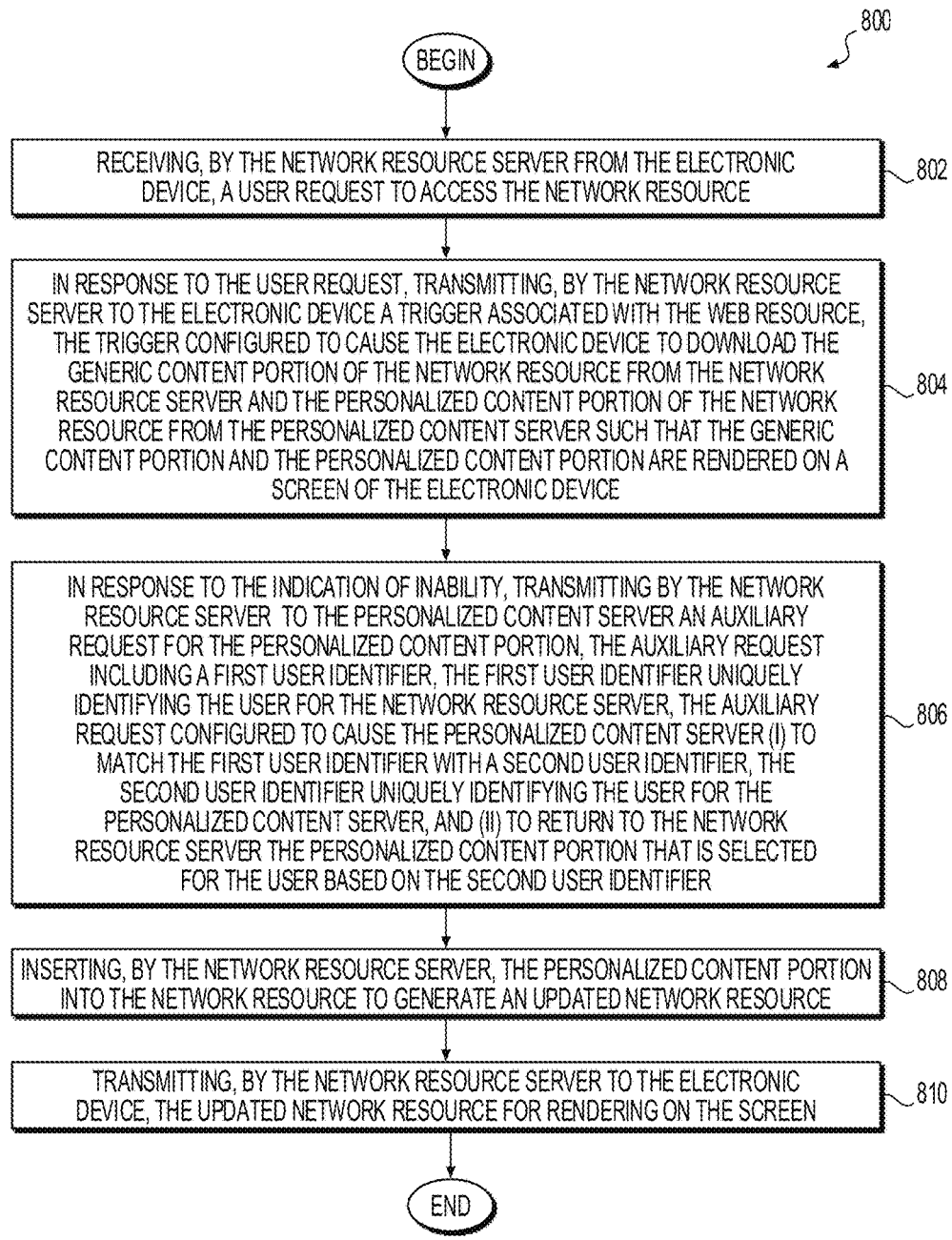
FIG. 8 depicts a block diagram of a flow chart of a method for transmitting a personalized message to an electronic device, the method being implemented within the system of FIG. 2 in accordance with some non-limiting embodiments of the present technology.

Given the architecture described above, it is possible to execute a method of sending personalized content to the electronic device 202 associated with a user 204. With reference to FIG. 8, there is depicted a block diagram of a method 800, the method 800 being implemented in accordance with non-limiting embodiments of the present technology. In some embodiments, the method 800 can be executed in a personalized content system 200, the personalized content system 200 including: the communications network 206; the network resource server 210 hosting a network resource 212 and accessible via the communications network 206, the network resource 212 having a generic content portion 702 and a personalized content portion 704; the electronic device 202 configured to access the network resource 212 via the communication network 206, the personalized content server 214 coupled to the communication network 206 and accessible by the network resource server 210 and the electronic device 202 via the communication network 206.

802—receiving, by the network resource server from the electronic device, a user request to access the network resource The method 800 starts at step 802, where the network resource server 210 receives from the electronic device 202, a user request to access the network resource 212.

804—in response to the user request, transmitting, by the network resource server to the electronic device a trigger associated with the network resource, the trigger configured to cause the electronic device to download the generic content portion of the network resource from the network resource server and the personalized content portion of the network resource from the personalized content server such that the generic content portion and the personalized content portion are rendered on a screen of the electronic device Next, at step 804, in response to the user request, the network resource server 210 transmits to the electronic device 202 a trigger associated with the network resource 212. The trigger is configured to cause the electronic device 202 to download the generic content portion 702 of the network resource 212 from the network resource server 210 and the personalized content portion 704 of the network resource 212 from the personalized content server 214 such that the generic content portion 702 and the personalized content portion 704 are rendered on a screen (not depicted) of the electronic device 202. The displaying the of the network resource 212 can be done by the browser application 208.

806—transmitting by the network resource server to the personalized content server an auxiliary request for the personalized content portion, the auxiliary request including a first user identifier, the first user identifier uniquely identifying the user for the network resource server, the auxiliary request configured to cause the personalized content server (i) to match the first user identifier with a second user identifier, the second user identifier uniquely identifying the user for the personalized content server, and (ii) to return to the network resource server the personalized content portion that is selected for the user based on the second user identifier At step 806, the network resource server 210 transmits to the personalized content server 214 an auxiliary request for the personalized content portion 704. The auxiliary request including a first user identifier, the first user identifier uniquely identifying the user 204 for the network resource server 210, the auxiliary request configured to cause the personalized content server 214 (i) to match the first user identifier with a second user identifier, the second user identifier uniquely identifying the user for the personalized content server 214, and (ii) to return to the network resource server 210 the personalized content portion 704 that is selected for the user 204 based on the second user identifier.

In some embodiments of the present technology, the network resource server 210 executes step 806 in response to receiving an indication of inability of the electronic device 202 to download the personalized content portion 704 from the personalized content server 214. As such, in some embodiments of the present technology, the method 800 may optionally include a step, prior to the step 806, of receiving, by the network resource server 210 from the electronic device 202, an indication of inability of the electronic device 202 to download the personalized content portion 704.

In other embodiments of the present technology, the network resource server 210 can execute step 806 by default or upon user-selected or administrator-selected option.

In some embodiments of the method 800, the personalized content server 214 is configured to select the personalized content portion 704. In some embodiments, this selection is executed based at least in part on at least a portion of a browsing history associated with the user 204, the at least the portion of the browsing history having been obtained, by the personalized content server 214 prior to the step 802 being executed.

In other embodiments, the at least the portion of the browsing history is obtained by the personalized content server 214 from the electronic device 202. It should be recalled that the electronic device 202 can execute the browser application 208, the browser application 208 for enabling the user 204 to access the network resource 212 and the browsing history is can be compiled, at least in part, by the browser application 208.

In alternative embodiments, the at least the portion of the browsing history is obtained by the personalized content server 214 by incorporating a tracking applet into one or more resources that have been visited by the user 204 of the electronic device 202.

808—inserting, by the network resource server, the personalized content portion into the network resource to generate an updated network resource Next, at step 808, the network resource server 210 inserts the personalized content portion 704 into the network resource 212 to generate an updated network resource.

In some embodiments of the method 800, the network resource 212 is encoded in an HTML code, and the step of inserting comprises encoding the personalized content portion 704 into HTML using a base64 standard.

In other embodiments, the step of the inserting comprises inserting a link configured to cause the electronic device 202 to download the personalized content portion 704 from the network resource server 210. Within some of these embodiments, the method 800 further comprises prior to inserting the link: downloading the personalized content portion 704 from the personalized content server 214, the personalized content portion 704 being implemented as an image; storing the image by the network resource server 210, the image having a unique address identifier; and wherein the link comprises an indication of the unique address identifier.

In yet additional embodiments, especially applicable but not limited to those embodiments where the network resource 212 is encoded in an HTML code, and the step of inserting comprises inserting a link configured to cause the electronic device 202 to download the personalized content portion 704 from one of: (i) the network resource server 210 and (ii) a third-party server (not depicted). The third-party server can be a hosting server or the like.

In some of the embodiments of the method, the method 800 further comprises, prior to the step of inserting, a step of receiving the personalized content portion 704 from the personalized content server 214. The receiving can be implemented in different ways.

For example, receiving can comprise receiving a compiled version of the personalized content portion 704 ready for insertion into the network resource 212. In addition to the receipt of the compiled version of the personalized content portion 704, the network resource server 210 can also receive from the personalized content server 214, rendering instructions associated with how the personalized content portion 704 is to be inserted into the network resource 212.

The step of receiving can also be implemented as receiving a non-compiled version of the personalized content portion 704 and, in those embodiments, the method 800 further comprises compiling the non-compiled version of the personalized content portion 704 into a compiled version of the personalized content portion 704 ready for insertion into the network resource 212. In some of those embodiments, the method 800 further comprises receiving, from the personalized content server 214, rendering instructions associated with the non-compiled personalized content portion 704 and the step of compiling is based, at least in part, on the rendering instructions.

810—transmitting, by the network resource server to the electronic device, the updated network resource for rendering on the screen Next, at step 810, the network resource server 210 transmits to the electronic device 202, the updated network resource 212 for rendering on the screen (not depicted) of the electronic device.

In some embodiments of the method 800, prior to executing step 802, the network resource server 210 provisions the first user identifier. In some embodiments, the step of provisioning includes: transmitting by the network resource server 210 to the electronic device 202 a cookie containing the indication of the first user identifier.

In some embodiments, the step of provisioning includes: transmitting by the network resource server 210 to the electronic device 202 a cookie containing the indication of the first user identifier; the electronic device 202 being configured to send the cookie to the personalized content server 214 such that the personalized content server 214 (i) generates the second user identifier; and (ii) creates a pairing between the first user identifier and the second user identifier and (iii) stores an indication of the pairing of the first user identifier and the second user identifier.

In some embodiments, the step of provisioning includes: transmitting by the network resource server 210 to the personalized content server 214 the first user identifier; receiving from the personalized content server a redirection prefix; and in response to the receiving, by the network resource server 210 from the electronic device 202, the user request to access the network resource 212: transmitting by the network resource server 210 to the electronic device 202 the trigger augmented in the redirection prefix, the redirection prefix configured to cause the electronic device 202 to: access the personalized content server 214 and to transmit thereto an indication of the first user identifier; the transmission of the first user identifier causing the personalized content server 214 to (i) generate the second user identifier; and (ii) create a pairing between the first user identifier and the second user identifier; and (iii) store an indication of the pairing of the first user identifier and the second user identifier and (iv) redirect the electronic device 202 to the network resource server 210.

The nature of the targeted message is not particular limited. In some embodiments of the present technology, the targeted message can be a banner ad. The targeted message can be embodied in any other kind of a targeted message: a promotional message, an informational message, a banner ad, a text ad, and the like.

In some embodiments of the present technology, a technical advantage can be enjoyed by delivering the personalized content according to embodiments of the present technology. By delivering personalized content as described herein, the user 204 may be able to obtain information the user 204 is interested in with fewer interactions with the network resource server 210, thus, reducing bandwidth consumption and/or load on the network resource server 210. Alternatively, the user 204 may be able to obtain knowledge of personalized content without extensive browsing or searching. Thus, not only this is more convenient for the user, but also reduced load on the network resource server 210 and the communication network 206. Additionally, faster obtaining of information can reduce the load on a battery of the electronic device 202, which is particularly useful but is not limited to those embodiments where the electronic device 202 is implemented as a wireless electronic device.

As such, from one perspective, embodiments of the present technology can be summarized as follows, structured in numbered clauses.

CLAUSE 1. A method (800) of sending personalized content to an electronic device (202) associated with a user (204), the method executable in a personalized content system (200), the personalized content system including:

a communication network (206);

a network resource server (210) hosting a network resource (212) and accessible via the communication network (206), the network resource (212) having a generic content portion (702) and a personalized content portion (704);

the electronic device (202) configured to access the network resource (212) via the communication network (206), a personalized content server (214) coupled to the communication network (206) and accessible by the network resource server (210) and the electronic device (202) via the communication network (206);

the method (800) comprising:

receiving (802), by the network resource server (210) from the electronic device (202), a user request (502) to access the network resource (212);

in response to the user request, transmitting (804), by the network resource server (210) to the electronic device (202) a trigger associated with the network resource (212), the trigger configured to cause the electronic device (202) to download the generic content portion (702) of the network resource (212) from the network resource server (210) and the personalized content portion (704) of the network resource (212) from the personalized content server (214) such that the generic content portion (702) and the personalized content portion (704) are rendered on a screen of the electronic device (202);

transmitting (806) by the network resource server (210) to the personalized content server (214) an auxiliary request for the personalized content portion (704), the auxiliary request including a first user identifier (504), the first user identifier (504) uniquely identifying the user (204) for the network resource server (210), the auxiliary request configured to cause the personalized content server (214) (i) to match the first user identifier (504) with a second user identifier (508), the second user identifier (508) uniquely identifying the user (204) for the personalized content server (214), and (ii) to return to the network resource server (210) the personalized content portion (704) that is selected for the user (204) based on the second user identifier (508);

inserting (808), by the network resource server (210), the personalized content portion (704) into the network resource (212) to render an updated network resource; and transmitting (810), by the network resource server (210) to the electronic device (202), the updated network resource for rendering on the screen.

CLAUSE 2. The method (800) of clause 1, further comprising receiving, by the network resource server (210) from the electronic device (202), an indication of inability of the electronic device to download the personalized content portion (704), and wherein transmitting (806) by the network resource server (210) to the personalized content server (214) the auxiliary request is executed in response to the indication of inability.

CLAUSE 3. The method (800) of any one of clauses 1 to 2 further comprising, at a time prior to the receiving (802), by the network resource server (210) from the electronic device (202), the user request to access the network resource (212):

provisioning by the network resource server (210) the first user identifier (504).

CLAUSE 4. The method (800) of clause 3 wherein the provisioning comprises:

transmitting by the network resource server (210) to the electronic device (202) a cookie containing the indication of the first user identifier (504).

CLAUSE 5. The method (800) of clause 1 further comprising, at a time prior to the receiving (802), by the network resource server (210) from the electronic device (202), the user request to access the network resource (212):

provisioning by the network resource server (210) the first user identifier (504); and transmitting by the network resource server (210) to the electronic device (202) a data packet containing the indication of the first user identifier (504); the electronic device (202) being configured to send the data packet to the personalized content server (214) such that the personalized content server (214) (i) generates the second user identifier (508); and (ii) creates a pairing (510) between the first user identifier (504) and the second user identifier (510) and (iii) stores an indication of the pairing (510) of the first user identifier (504) and the second user identifier (508).

CLAUSE 6. The method (800) of clause 5, wherein the first user identifier (504) is a cookie.

CLAUSE 7. The method (800) of clause 5, wherein the electronic device (202) is a wireless electronic device, and wherein the first user identifier (504) is a mobile operating system identifier.

CLAUSE 8. The method (800) of clause 1 further comprising, at a time prior to the receiving (802), by the network resource server (210) from the electronic device (202), the user request to access the network resource (212):

provisioning by the network resource server (210) the first user identifier (504);

transmitting by the network resource server (210) to the personalized content server (214) the first user identifier (504);

receiving from the personalized content server (214) a redirection prefix;

in response to the receiving, by the network resource server (210) from the electronic device (202), the user request to access the network resource (212):

transmitting by the network resource server (210) to the electronic device (202) the trigger augmented in the redirection prefix, the redirection prefix configured to cause the electronic device (202) to:

access the personalized content server (214) and to transmit thereto an indication of the first user identifier;

the transmission of the first user identifier causing the personalized content server (214) to (i) generate the second user identifier (508); and (ii) create a pairing (510) between the first user identifier (504) and the second user identifier (508); and (iii) store an indication of the pairing (510) of the first user identifier (504) and the second user identifier (508) and (iv) redirect the electronic device (202) to the network resource server (210) with an indication pointing to the network resource (212).

CLAUSE 9. The method (800) of clause 8, wherein the as part of redirection, the personalized content server (214) further transmits an indication of the first user identifier (504) to the network resource server (210).

CLAUSE 10. The method (800) of any one of clauses 1 to 9, wherein the personalized content portion (704) is selected based at least in part on at least a portion of a personalization data associated with the user (204), the at least the portion of the personalization data having been obtained, by the personalized content server (214), prior to the receiving (802), by the network resource server (210) from the electronic device (202), the user request to access the network resource (212).

CLAUSE 11. The method (800) of clause 10, wherein the personalization data comprises at least one of: (i) browsing history, (ii) a list of application installed on the electronic device (202), (iii) usage information associated with at least one of the applications installed on the electronic device (202), and (iv) geo-information associated with the electronic device (202), the geo-information being at least one of historic and current.

CLAUSE 12. The method (800) of clause 10, wherein the at least the portion of the personalization data is obtained by the personalized content server (214) from the electronic device (202).

CLAUSE 13. The method (800) of clause 12, wherein the electronic device (202) executes a browser application (208), the browser application (208) for enabling the user (204) to access the network resource (212) and wherein the personalization data is compiled, at least in part, by the browser application (208).

CLAUSE 14. The method (800) of clause 10, wherein the at least the portion of the personalization data comprises browsing history and is obtained by the personalized content server (214) by incorporating a tracking applet into one or more resources that have been visited by the user (204) of the electronic device (202).

CLAUSE 15. The method (800) of any one of clauses 1 to 14, wherein the network resource (212) is encoded in an HTML code, and wherein the inserting (808), by the network resource server (210), the personalized content portion (704) into the network resource (212) comprises encoding the personalized content portion (214) into HTML using a base64 standard.

CLAUSE 16. The method (800) of any one of clauses 1 to 14, wherein the network resource (212) is encoded in an HTML code, and wherein the inserting (808), by the network resource server (210), the personalized content portion (704) into the network resource (212) comprises inserting a link configured to cause the electronic device (202) to download the personalized content portion (704) from the network resource server (210).

CLAUSE 17. The method (800) of clause 16, further comprises prior to the inserting the link:

downloading the personalized content portion (704) from the personalized content server (214), the personalized content portion being implemented as an image;

storing the image by the network resource server (210), the image having a unique address identifier; and wherein the link comprises an indication of the unique address identifier.

CLAUSE 18. The method (800) of any one of clauses 1 to 14, wherein the network resource (212) is encoded in an HTML code, and wherein the inserting (808), by the network resource server (210), the personalized content portion (704) into the network resource (212) comprises inserting a link configured to cause the electronic device (202) to download the personalized content portion (704) from one of: (i) the network resource server (210) and (ii) a third-party server.

CLAUSE 19. The method (800) of any one of clauses 1 to 14, wherein the method (800) further comprises, prior to inserting (808), receiving the personalized content portion (704) from the personalized content server (214), and wherein the receiving comprises:

receiving a compiled version of the personalized content portion (704) ready for insertion into the network resource (212).

CLAUSE 20. The method (800) of clause 19, further comprises receiving rendering instructions associated with how the personalized content portion (704) is to be inserted into the network resource (212).

CLAUSE 21. The method (800) of any one of clauses 1 to 14, wherein the method (800) further comprises, prior to inserting (808), receiving the personalized content portion (704) from the personalized content server (214), and wherein the receiving comprises:

receiving a non-compiled version of the personalized content portion (704), the method (800) further comprising compiling the non-compiled version of the personalized content portion (704) into a compiled version of the personalized content portion (704) ready for insertion into the network resource (212).

CLAUSE 22. The method (800) of clause 21, further comprising receiving rendering instructions associated with the non-compiled personalized content portion (704) and wherein the compiling is based, at least in part, on the rendering instructions.

CLAUSE 23. A personalized content system (200) comprising:

a communication network (206);

a network resource server (210) hosting a network resource (212) and accessible via the communication network (206), the network resource (212) having a generic content portion (702) and a personalized content portion (704);

an electronic device (202) configured to access the network resource (212) via the communication network (206), a personalized content server (214) coupled to the communication network (206) and accessible by the network resource server (210) and the electronic device (202) via the communication network (206);

the network resource server (210) comprising:

a communication interface for communication with the electronic device (202) via the communication network (206), a processor operationally connected with the communication interface, the processor configured to:

receive from the electronic device (202), a user request (502) to access the network resource (212);

in response to the user request, transmit to the electronic device (202) a trigger associated with the network resource (212), the trigger configured to cause the electronic device (202) to download the generic content portion (702) of the network resource (212) from the network resource server (210) and the personalized content portion (704) of the network resource (212) from the personalized content server (214) such that the generic content portion (702) and the personalized content portion (704) are rendered on a screen of the electronic device (202);

transmit to the personalized content server (214) an auxiliary request for the personalized content portion (704), the auxiliary request including a first user identifier (504), the first user identifier (504) uniquely identifying the user (204) for the network resource server (210), the auxiliary request configured to cause the personalized content server (214) (i) to match the first user identifier (504) with a second user identifier (508), the second user identifier (508) uniquely identifying the user (204) for the personalized content server (214), and (ii) to return to the network resource server (210) the personalized content portion (704) that is selected for the user (204) based on the second user identifier (508);

insert the personalized content portion (704) into the network resource (212) to render an updated network resource; and transmit to the electronic device (202), the updated network resource for rendering on the screen.

CLAUSE 24. A network resource server (210) comprising:

a communication interface for communication with an electronic device (202) via a communication network (206), a processor operationally connected with the communication interface, the processor configured to:

host a network resource (212) having a generic content portion (702) and a personalized content portion (704); the generic content portion (702) of the network resource (212) being accessible via the communication network (206) from the network resource server (210) and the personalized content portion (704) being accessible from a personalized content server (214) coupled to the communication network (206) and accessible by the network resource server (210) and the electronic device via the communication network (206);

receive from the electronic device (202), a user request (502) to access the network resource (212);

in response to the user request, transmit to the electronic device (202) a trigger associated with the network resource (212), the trigger configured to cause the electronic device (202) to download the generic content portion (702) of the network resource (212) from the network resource server (210) and the personalized content portion (704) of the network resource (212) from the personalized content server (214) such that the generic content portion (702) and the personalized content portion (704) are rendered on a screen of the electronic device (202);

transmit to the personalized content server (214) an auxiliary request for the personalized content portion (704), the auxiliary request including a first user identifier (504), the first user identifier (504) uniquely identifying the user (204) for the network resource server (210), the auxiliary request configured to cause the personalized content server (214) (i) to match the first user identifier (504) with a second user identifier (508), the second user identifier (508) uniquely identifying the user (204) for the personalized content server (214), and (ii) to return to the network resource server (210) the personalized content portion (704) that is selected for the user (204) based on the second user identifier (508);

insert the personalized content portion (704) into the network resource (212) to render an updated network resource; and transmit to the electronic device (202), the updated network resource for rendering on the screen.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of sending personalized content to an electronic device associated with a user, the method executable in a personalized content system, the personalized content system including: a communication network; a network resource server hosting a network resource and accessible via the communication network, the web resource having a generic content portion and a personalized content portion; the electronic device configured to access the network resource via the communication network, a personalized content server coupled to the communication network and accessible by the network resource server and the electronic device via the communication network; the method comprising: receiving, by the network resource server from the electronic device, a user request to access the network resource; in response to the user request, transmitting, by the network resource server to the electronic device a trigger associated with the network resource, the trigger configured to cause the electronic device to download the generic content portion of the network resource from the network resource server and the personalized content portion of the network resource from the personalized content server such that the generic content portion and the personalized content portion are rendered on a screen of the electronic device; transmitting by the network resource server to the personalized content server an auxiliary request for the personalized content portion, the auxiliary request including a first user identifier, the first user identifier uniquely identifying the user for the network resource server, the auxiliary request configured to cause the personalized content server (i) to match the first user identifier with a second user identifier, the second user identifier uniquely identifying the user for the personalized content server, and (ii) to return to the network resource server the personalized content portion that is selected for the user based on the second user identifier; inserting, by the network resource server, the personalized content portion into the network resource to render an updated network resource; transmitting, by the network resource server to the electronic device, the updated network resource for rendering on the screen; receiving, by the network resource server from the electronic device, an indication of inability of the electronic device to download the personalized content portion, and wherein transmitting by the network resource server to the personalized content server the auxiliary request is executed in response to the indication of inability; and further comprising, at a time prior to the receiving, by the network resource server from the electronic device, the user request to access the network resource: provisioning by the network resource server the first user identifier; and transmitting by the network resource server to the electronic device a data packet containing the indication of the first user identifier; the electronic device being configured to send the data packet to the personalized content server such that the personalized content server (i) generates the second user identifier; and (ii) creates a pairing between the first user identifier and the second user identifier and (iii) stores an indication of the pairing of the first user identifier and the second user identifier.

2. The method of claim 1 further comprising, at a time prior to the receiving, by the network resource server from the electronic device, the user request to access the network resource: provisioning by the network resource server the first user identifier.

3. The method of claim 2 wherein the provisioning comprises: transmitting by the network resource server to the electronic device a cookie containing the indication of the first user identifier.

4. The method of claim 1, wherein the first user identifier is a cookie.

5. The method of claim 1, wherein the electronic device is a wireless electronic device, and wherein the first user identifier is a mobile operating system identifier.

6. The method of claim 1, further comprising, at a time prior to the receiving, by the network resource server from the electronic device, the user request to access the network resource: provisioning by the network resource server the first user identifier; transmitting by the network resource server to the personalized content server the first user identifier; receiving from the personalized content server a redirection prefix; in response to the receiving, by the network resource server from the electronic device, the user request to access the network resource: transmitting by the network resource server to the electronic device the trigger augmented in the redirection prefix, the redirection prefix configured to cause the electronic device to: access the personalized content server and to transmit thereto an indication of the first user identifier; the transmission of the first user identifier causing the personalized content server to (i) generate the second user identifier; and (ii) create a pairing between the first user identifier and the second user identifier; and (iii) store an indication of the pairing of the first user identifier and the second user identifier and (iv) redirect the electronic device to the network resource server with an indication pointing to the network resource.

7. The method of claim 1, wherein the personalized content portion is selected based at least in part on at least a portion of a personalization data associated with the user, the at least the portion of the personalization data having been obtained, by the personalized content server, prior to the receiving, by the network resource server from the electronic device, the user request to access the network resource.

8. The method of claim 7, wherein the personalization data comprises at least one of: (i) browsing history, (ii) a list of application installed on the electronic device, (iii) usage information associated with at least one of the applications installed on the electronic device, and (iv) geo-information associated with the electronic device, the geo-information being at least one of historic and current.

9. The method of claim 7, wherein the at least the portion of the personalization data is obtained by the personalized content server from the electronic device.

10. The method of claim 9, wherein the electronic device executes a browser application, the browser application for enabling the user to access the network resource and wherein the personalization data is compiled, at least in part, by the browser application.

11. The method of claim 7, wherein the at least the portion of the personalization data comprises browsing history and is obtained by the personalized content server by incorporating a tracking applet into one or more resources that have been visited by the user of the electronic device.

12. The method of claim 1, wherein the network resource is encoded in an HTML code, and wherein the inserting, by the network resource server, the personalized content portion into the network resource comprises encoding the personalized content portion into HTML using a base64 standard.

13. The method of claim 1, wherein the network resource is encoded in an HTML code, and wherein the inserting, by the network resource server, the personalized content portion into the network resource comprises inserting a link configured to cause the electronic device to download the personalized content portion from the network resource server, and wherein the method further comprises prior to the inserting the link: downloading the personalized content portion from the personalized content server, the personalized content portion being implemented as an image; storing the image by the network resource server, the image having a unique address identifier; and wherein the link comprises an indication of the unique address identifier.

14. The method of claim 1, wherein the network resource is encoded in an HTML code, and wherein the inserting, by the network resource server, the personalized content portion into the network resource comprises inserting a link configured to cause the electronic device to download the personalized content portion from one of: (i) the network resource server and (ii) a third-party server.

15. The method of claim 1, wherein the method further comprises, prior to inserting, receiving the personalized content portion from the personalized content server, and wherein the receiving comprises: receiving a compiled version of the personalized content portion ready for insertion into the network resource.

16. The method of claim 1, wherein the method further comprises, prior to inserting, receiving the personalized content portion from the personalized content server, and wherein the receiving comprises: receiving a non-compiled version of the personalized content portion, the method further comprising compiling the non-compiled version of the personalized content portion into a compiled version of the personalized content portion ready for insertion into the network resource.

17. A personalized content system comprising: a communication network; a network resource server hosting a network resource and accessible via the communication network, the web resource having a generic content portion and a personalized content portion; an electronic device configured to access the network resource via the communication network, a personalized content server coupled to the communication network and accessible by the network resource server and the electronic device via the communication network; the network resource server comprising: a communication interface for communication with the electronic device via the communication network, a processor operationally connected with the communication interface, the processor configured to: receive from the electronic device, a user request to access the network resource; in response to the user request, transmit to the electronic device a trigger associated with the network resource, the trigger configured to cause the electronic device to download the generic content portion of the network resource from the network resource server and the personalized content portion of the network resource from the personalized content server such that the generic content portion and the personalized content portion are rendered on a screen of the electronic device; transmit to the personalized content server an auxiliary request for the personalized content portion, the auxiliary request including a first user identifier, the first user identifier uniquely identifying the user for the network resource server, the auxiliary request configured to cause the personalized content server (i) to match the first user identifier with a second user identifier, the second user identifier uniquely identifying the user for the personalized content server, and (ii) to return to the network resource server the personalized content portion that is selected for the user based on the second user identifier; insert the personalized content portion into the network resource to render an updated network resource; and transmit to the electronic device, the updated network resource for rendering on the screen; receive from the electronic device, an indication of inability of the electronic device to download the personalized content portion, and wherein transmitting to the personalized content server the auxiliary request is executed in response to the indication of inability; and at a time prior to the receiving the user request to access the network resource from the electronic device: provision the first user identifier; and transmit to the electronic device a data packet containing the indication of the first user identifier; the electronic device being configured to send the data packet to the personalized content server such that the personalized content server (i) generates the second user identifier; and (ii) creates a pairing between the first user identifier and the second user identifier and (iii) stores an indication of the pairing of the first user identifier and the second user identifier.

18. A network resource server comprising: a communication interface for communication with an electronic device via a communication network, a processor operationally connected with the communication interface, the processor configured to: host a network resource having a generic content portion and a personalized content portion; the generic content portion of the network resource being accessible via the communication network from the network resource server and the personalized content portion being accessible from a personalized content server coupled to the communication network and accessible by the network resource server and the electronic device via the communication network; receive from the electronic device, a user request to access the network resource; in response to the user request, transmit to the electronic device a trigger associated with the network resource, the trigger configured to cause the electronic device to download the generic content portion of the network resource from the network resource server and the personalized content portion of the network resource from the personalized content server such that the generic content portion and the personalized content portion are rendered on a screen of the electronic device; transmit to the personalized content server an auxiliary request for the personalized content portion, the auxiliary request including a first user identifier, the first user identifier uniquely identifying the user for the network resource server, the auxiliary request configured to cause the personalized content server (i) to match the first user identifier with a second user identifier, the second user identifier uniquely identifying the user for the personalized content server, and (ii) to return to the network resource server the personalized content portion that is selected for the user based on the second user identifier; insert the personalized content portion into the network resource to render an updated network resource; and transmit to the electronic device, the updated network resource for rendering on the screen; receive from the electronic device an indication of inability of the electronic device to download the personalized content portion, and wherein transmitting to the personalized content server the auxiliary request is executed in response to the indication of inability; and at a time prior to the receiving the user request to access the network resource from the electronic device: provision the first user identifier; and transmit to the electronic device a data packet containing the indication of the first user identifier; the electronic device being configured to send the data packet to the personalized content server such that the personalized content server (i) generates the second user identifier; and (ii) creates a pairing between the first user identifier and the second user identifier and (iii) stores an indication of the pairing of the first user identifier and the second user identifier.

* * * * *